(12) United States Patent
Wang et al.

(10) Patent No.: US 11,619,410 B2
(45) Date of Patent: Apr. 4, 2023

(54) BUILDING HVAC CONTROL SYSTEM, METHOD AND WIRELESS MESH DEVICE

(71) Applicant: iDRC Sustainable Technologies (Shanghai) Limited, Shanghai (CN)

(72) Inventors: Yan-Ping Wang, Shanghai (CN); Alexandre Amat Rodriguez, Shanghai (CN); Pedro Luis Serapio de Assuncao Pestana, Shanghai (CN); Yair Bonastre Majoral, Shanghai (CN)

(73) Assignee: iDRC Sustainable Technologies (Shanghai) Limited, Shanghai (CN)

(*) Notice: Subject to any disclaimer, the term of this patent is extended or adjusted under 35 U.S.C. 154(b) by 12 days.

(21) Appl. No.: 17/204,705

(22) Filed: Mar. 17, 2021

(65) Prior Publication Data

US 2021/0293429 A1    Sep. 23, 2021

(30) Foreign Application Priority Data

Mar. 17, 2020    (CN) .......................... 202010186813.X

(51) Int. Cl.
*F24F 11/30* (2018.01)
*F24F 11/63* (2018.01)
(Continued)

(52) U.S. Cl.
CPC .............. *F24F 11/30* (2018.01); *F24F 11/56* (2018.01); *F24F 11/63* (2018.01); *G05B 13/041* (2013.01);
(Continued)

(58) Field of Classification Search
CPC .. F24F 11/30; F24F 11/63; F24F 11/56; F24F 2140/60; F24F 2140/00; F24F 2110/10;
(Continued)

(56) References Cited

U.S. PATENT DOCUMENTS 9,921,559 B2 *  3/2018  Tsubota ................. G05B 15/02
10,691,464 B1 *  6/2020  Drego ................. G06F 15/8023
(Continued)

FOREIGN PATENT DOCUMENTS

CN    101738975 A    6/2010
CN    206039816 U    3/2017
(Continued)

OTHER PUBLICATIONS

Maruoka, Y. and Ueda, K., 2013, March. A method for establishing routes and IPv6 addressing based on the estimated distance from neighboring nodes in wireless mesh networks. In 2013 27th International Conference on Advanced Information Networking and Applications Workshops (pp. 21-26). IEEE. (Year: 2013).*
(Continued)

*Primary Examiner* — Alicia M. Choi
(74) *Attorney, Agent, or Firm* — Wolf, Greenfield & Sacks, P.C.

(57) ABSTRACT

A building HVAC control system is provided, including at least one wireless mesh network. The wireless mesh network includes a plurality of wireless mesh nodes, the wireless mesh nodes include: at least one sensing node, configured to communicate with sensors installed in a building and obtain measured environment data collected by the sensors; at least one control node, configured to communicate with HVAC equipment, and send control commands to the HVAC equipment; at least one router node, configured to transmit data between the wireless mesh nodes, and transmit data between the wireless mesh nodes and the router. The wireless mesh nodes can perform device-to-device communications by transmitting and receiving wireless signals through the mesh without passing through the server, thereby enabling efficient, multi-node control loops that add no additional computational load to the server while increasing the safety of (Continued)

data transmission and the overall reliability of the HVAC control system.

16 Claims, 6 Drawing Sheets

(51) Int. Cl.
| | |
|---|---|
| *F24F 11/56* | (2018.01) |
| *G05B 13/04* | (2006.01) |
| *F24F 140/60* | (2018.01) |
| *F24F 140/00* | (2018.01) |
| *F24F 110/10* | (2018.01) |
| *H04W 84/18* | (2009.01) |

(52) U.S. Cl.
CPC ....... *F24F 2110/10* (2018.01); *F24F 2140/00* (2018.01); *F24F 2140/60* (2018.01); *H04W 84/18* (2013.01)

(58) Field of Classification Search
CPC .... G05B 13/041; H04W 84/18; H04W 40/02; H04W 24/02; H04L 67/12
See application file for complete search history.

(56) References Cited

U.S. PATENT DOCUMENTS

| | | | | |
|---|---|---|---|---|
| 2003/0051023 | A1* | 3/2003 | Reichel | G01N 33/0075 709/223 |
| 2006/0282498 | A1* | 12/2006 | Muro | H04L 67/12 709/203 |
| 2007/0055757 | A1* | 3/2007 | Mairs | H04L 12/2814 709/223 |
| 2012/0085831 | A1* | 4/2012 | Kopp | F24F 11/30 236/46 A |
| 2012/0109404 | A1* | 5/2012 | Pandey | H04L 67/12 700/275 |
| 2014/0034145 | A1* | 2/2014 | Burt | F24F 11/83 137/59 |
| 2015/0100167 | A1* | 4/2015 | Sloo | G08B 25/012 700/278 |
| 2018/0317095 | A1* | 11/2018 | Rumler | H04W 24/10 |
| 2019/0162436 | A1* | 5/2019 | Albinger | F24F 11/74 |
| 2021/0293429 | A1* | 9/2021 | Wang | F24F 11/63 |

FOREIGN PATENT DOCUMENTS

| | | |
|---|---|---|
| CN | 207692109 U | 8/2018 |
| JP | 2016-031205 A | 3/2016 |
| KR | 2010-0077835 A | 7/2010 |

OTHER PUBLICATIONS

Chinese Office Action dated Feb. 20, 2021 in connection with Chinese Application No. 202010186813.X.

* cited by examiner

BUILDING HVAC CONTROL SYSTEM, METHOD AND WIRELESS MESH DEVICE

CROSS-REFERENCE TO RELATED APPLICATIONS

This application is based upon and claims priority to Chinese Patent Application No. 202010186813.X, filed on Mar. 17, 2020, the entire contents of which are incorporated herein by reference.

TECHNICAL FIELD

The present disclosure relates to building HVAC control technology, and more particularly to the building HVAC control system, method and wireless mesh device.

BACKGROUND

An HVAC (Heating, Ventilation and Air Conditioning) system refers to a system or relative devices for indoor heating, ventilation and air conditioning. The HVAC system can regulate air temperature or humidity, improve indoor comfort, and is widely used in buildings of all types.

In existing HVAC control system, sensors for collecting indoor environment parameters, a central controller and air conditioning devices are connected through hard wiring, causing complex wiring in the building. For the medium-scale or large-scale building, there are large computational loads for routers and the central controller. Also, if the central controller breaks down, the whole HVAC system will be difficult to operate normally.

SUMMARY

In the present disclosure, a building HVAC control system is provided, including at least one wireless mesh network, wherein, the wireless mesh network includes at least one router and a plurality of wireless mesh nodes, the wireless mesh nodes include:

at least one sensing node, configured to communicate with sensors installed in a building, and obtain measured environment data collected by the sensors;

at least one control node, configured to communicate with HVAC equipment, and send control commands to the HVAC equipment;

at least one router node, configured to transmit data between the wireless mesh nodes, and transmit data between the wireless mesh nodes and the router.

In the present disclosure, a building HVAC control method using the building HVAC control system is provided, which includes the following steps:

the sensing node communicating with the sensors in the building, and obtaining the measured environment data collected by the sensors;

the sensor nodes sending the measured environment data to the control node configured to control the corresponding HVAC equipment;

after receiving the measured environment data, the control node generating a control command according to a pre-defined control strategy to control the HVAC equipment corresponding to the sensors;

the control node sending the control commands to the HVAC equipment.

In the present disclosure, a wireless mesh device is provided, which includes:

a chip, configured to communicate with the sensors in the building, collect the measured environment data from the sensors, generate the control commands according to the pre-defined control strategy to control the HVAC equipment corresponding to the sensors, and send the control commands to the corresponding HVAC equipment;

a wireless communication module; and an electrical control element used for signal conversion between the sensors, the HVAC equipment and the chip.

It should be readily understood that both the foregoing general description and the following detailed description are exemplary and explanatory only, and are not intended as a limitation to the scope of the present disclosure.

BRIEF DESCRIPTION OF THE DRAWINGS

The foregoing and other features, and advantages of the invention are apparent from the following detailed description taken in conjunction with the accompanying drawings in which.

DETAILED DESCRIPTION

In the following, embodiments of the present disclosure will be described in detail with reference to the figures. The concept of the present disclosure can be implemented in a plurality of forms, and should not be understood to be limited to the embodiments described hereafter. In contrary, these embodiments are provided to make the present disclosure more comprehensive and understandable, and so the conception of the embodiments can be conveyed to those skilled in the art fully. Same reference signs in the figures refer to same or similar elements, so repeated description of them will be omitted.

The technical features, assemblies, and characteristics can be combined in any appropriate way in one or more embodiments. In the following, more specific details are provided to give a full understanding to the embodiments of the present disclosure. However, those skilled in the art should realize that the technical proposal can also be realized without one or more of the specific details, or with other assemblies or components. In other conditions, some common assemblies or components well known in the art are not described to avoid making the present disclosure unclear.

To solve the technical problem in the existing technology, the present disclosure provides a building HVAC control system, which can largely increase control efficiency of the building HVAC system, simplify the control communication wiring of the HVAC control system, reduce data transmission load of the routers and computational load of the server, and increase reliability of transmitting data and control commands in the HVAC control system.

Figure 1:
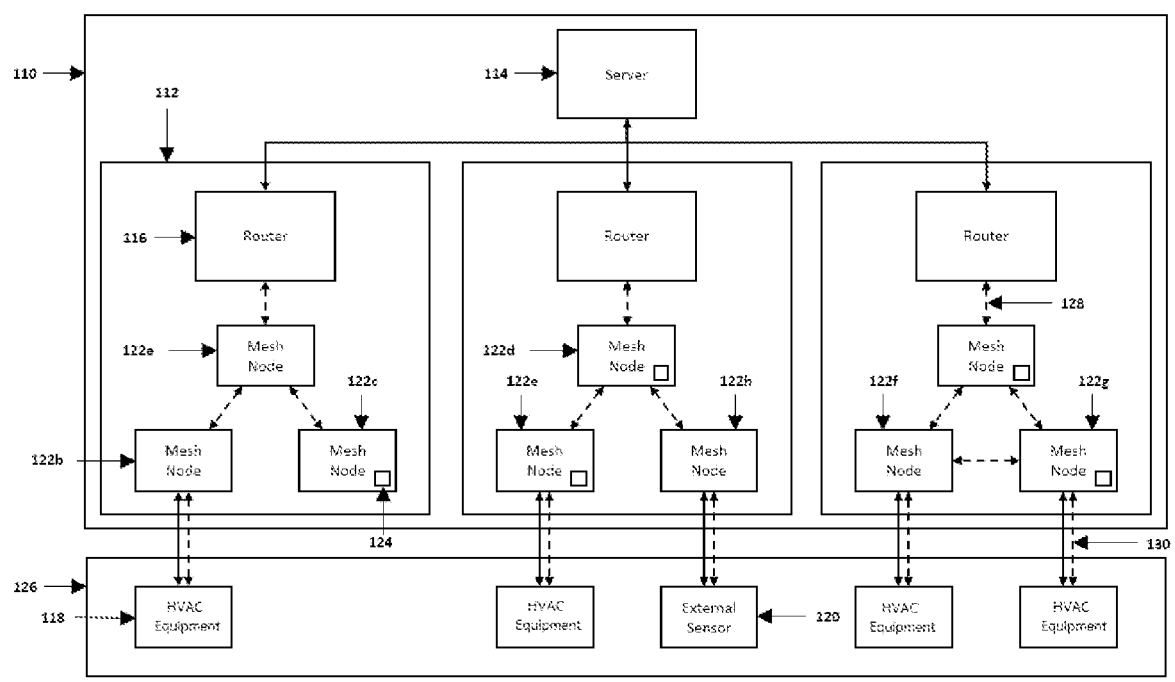
FIG. 1 is a schematic view of a building HVAC control system according to an embodiment of the present disclosure.

As shown in FIG. 1, in an embodiment of the present disclosure, the building HVAC control system includes one or more wireless mesh networks 112, and the wireless mesh network 112 includes at least one router 116 and a plurality of wireless mesh nodes 122. The router 116 forms a backbone network, and the router 116 is configured to connect to the external wired network. The router 116 is configured to provide multi-hop wireless connection between the wireless mesh nodes 122. In the wireless mesh network 112, any wireless mesh node 122 is capable of sending and receiving signal, and each node 122 can communicate with any node directly. Therefore, if a node 122 is congested for large communication flow, the data can be routed to and transmitted by an adjacent node having a smaller communication flow. The controlled HVAC system 126 includes a plurality of HVAC equipment 118 and corresponding external sensors 120, the wireless mesh node 122 can communicate with the HVAC equipment 118 and the external sensors 120 in a wireless or wired manner.

Compared to a typical wired network, the wireless mesh network 122 has no need for wiring between the network nodes, and has a redundancy mechanism and a function of rerouting as a distributed network.

The wireless mesh nodes can perform device-to-device communications by transmitting and receiving wireless signals through the mesh without passing through the server, thereby enabling efficient, multi-node control loops that add no additional computational load to the server while increasing the safety of data transmission and the overall reliability of the HVAC control system.

Therefore, in the present disclosure, the wireless mesh network 112 is used for building HVAC control, the control communication wiring of the building HVAC equipment is simplified, the wireless mesh nodes can communicate with each other, thereby decreasing the data transmission load of the routers and increasing the safety of data transmission at the same time. When a new network node is needed in the wireless mesh network 112, it only needs to connect the new network node to power supply, then the new network node can be configured by itself and determine a best multi-hop communication route. Therefore, the arrangement of the wireless mesh network 112 is more convenient. The dynamic route algorithm of the wireless mesh network 112 allows the nodes to communicate with minimum communication time and power consumption.

As shown in FIG. 1, the wireless mesh nodes 122 communicate with each other in a wireless manner 128, and the wireless mesh nodes 122 communicate with the HVAC equipment 118 in a wired or wireless manner 130, the wireless mesh nodes 122 communicate with the external sensors in a wired or wireless manner 130. The wireless mesh nodes 122 includes at least one sensing node, at least one control node and at least one router node, which respectively have different functions.

Specifically, the sensing node is configured to communicate with the sensors placed in the building, and obtain the measured environment data collected by the sensors. Wherein, the sensors may include external sensors 120 disposed outside the sensing node and internal sensors 124 disposed inside the sensing node. For example, the mesh node 122h in FIG. 1 is configured to communicate with the external sensor 120, the mesh node 122c is configured to communicate with the internal sensor 124. The measured environment data includes but not limited to one or more kinds of temperature, humidity, lighting levels, $CO_2$ concentration, PM2.5 value, TVOC (Total Volatile Organic Compounds) concentration, formaldehyde value and ozone value. Correspondingly, the sensors include but are not limited to one or more kinds of temperature sensors, humidity sensors, occupancy sensors, microphones, lighting level sensors, $CO_2$ sensors, PM2.5 sensors, TVOC sensors, formaldehyde sensors and ozone sensors.

The control node is configured to communicate with the HVAC equipment 118 and send control commands to the HVAC equipment 118. For example, the mesh node 122b and the mesh node 122e in FIG. 1 may respectively communicate with the HVAC equipment 118.

The router node is configured to transmit data between the wireless mesh nodes 122 and transmit data between the wireless mesh nodes 122 and the router 116. For example, as shown in FIG. 1, the mesh node 122a communicates with the router 116, the other mesh nodes 122 in the wireless mesh network can also directly communicate with the router 116, thereby transmitting data between the mesh nodes 122 and the router 116, and transmitting data between the mesh nodes 122 and the router 116. In other embodiments, the mesh node 122 configured to communicate with the router 116 may also be changed. For example, when the mesh node 122a has a large communication flow or breaks down, the mesh node 122b or the mesh node 122c can directly communicate with the router 116.

In the embodiment, each mesh node 122 can transmit data to the wireless mesh network. A wireless mesh node 122 may have one function of the sensing node, the control node or the router node. A wireless mesh node 122 also may have two or three functions of the sensing node, the control node and the router node. For example, as shown in FIG. 1, the mesh node 122a has the function of the router node, the mesh node 122b has the function of the control node, the mesh nodes 122c and 122h have the function of the sensing node, the mesh node 122e has the functions of the sensing node and the control node, the mesh node 122d has the functions of the sensing node and the router node, the mesh node 122f has the functions of the router node and the control node, the mesh node 122g has the functions of the sensing node, the control node and the router node. Therefore, the mesh node 122 controls the HVAC equipment based on the control commands to optimize the operation efficiency of the HVAC equipment.

Figure 2:
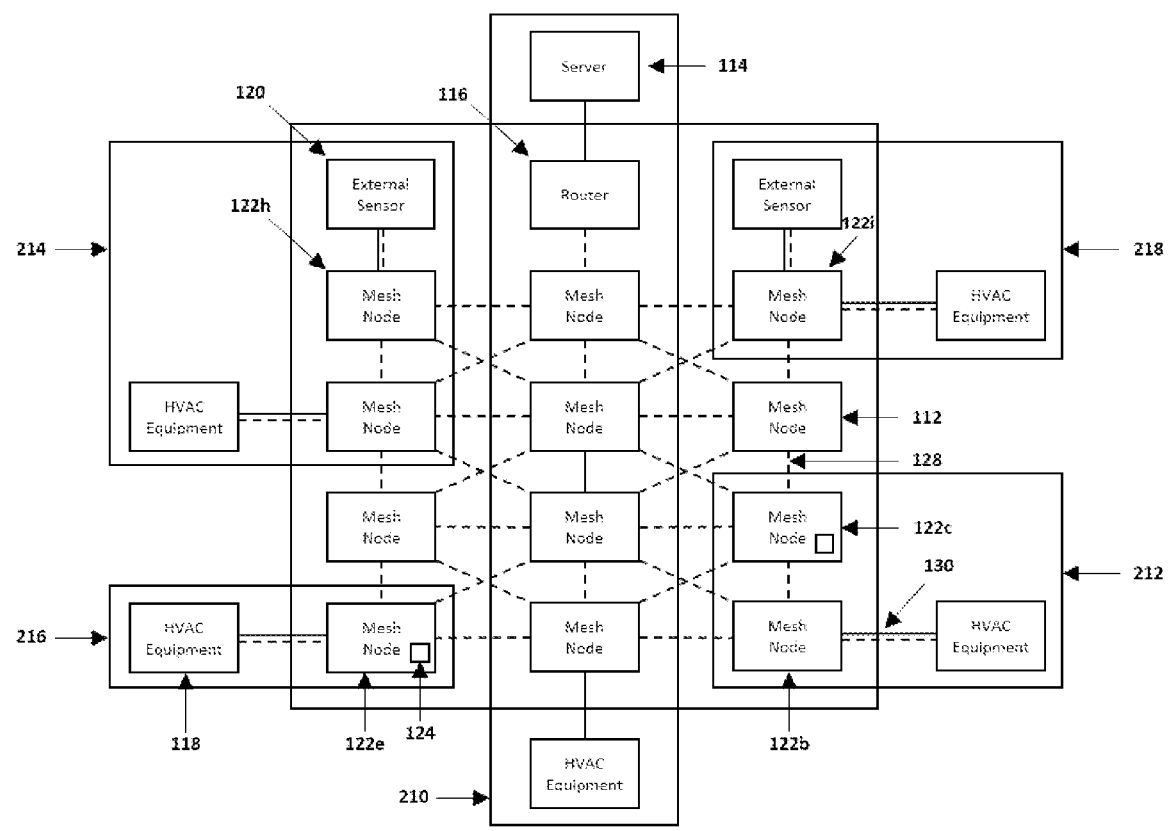
FIG. 2 is a schematic view of a wireless mesh network of the embodiment of the present disclosure.

FIG. 2 shows the specific structure of the wireless mesh network. In the embodiment, after receiving the measured environment data from the external sensor 120 and/or the internal sensor 124, the sensing node sends the measured environment data to the control node configured to communicate with the corresponding HVAC equipment 118. The control node receives the measured environment data, generates a control command according to a pre-defined control strategy, and sends the control command to the corresponding HVAC equipment. Therefore, in the embodiment, the sensing node and the control node can form a control loop independent of the server. When the sensing function and control function are realized by different nodes, the sensing node, the control node, the sensor, and the HVAC equipment 118 form a control loop. For example, as shown in FIG. 2, the sensing node 122c, the control node 122b, the internal sensor 124 and the HVAC equipment 118 together form a control loop 212. The sensing node 122c in the control loop 212 connects to the internal sensor 124, the control node 122b connects to the HVAC equipment 118, and can realize the HVAC control function independently of the sensor. The mesh node 122h, the external sensor 120 and the HVAC equipment 118 together form a control loop 214. The mesh node having both of the sensing function and the control function can form a control loop independent of the server 114 with the sensor and the HVAC equipment 118. For example, the mesh node 122e, the internal sensor 124 and the HVAC equipment 118 together from a control loop 216, the mesh node 122i, the external sensor 120 and the HVAC equipment 118 form a control loop 218. Each of the control loops 212, 214, 216 and 218 can receive commands from the server through the router node, and transmit measured environment data and status data to the server. Each control loop can also work independently of the server, to realize the functions of collecting measured environment data and controlling the HVAC equipment. Besides, for the control loop 216, as the wireless mesh node 122e can realize both of the sensing function and the control function, a single wireless mesh node 122e can also collect measured environment data and control the HVAC equipment independently of the wireless mesh network. Even when the wireless mesh network cannot transmit data normally, the control loop 216 can work normally and independently. Similarly, in the control loop 218, the wireless mesh node 122i can realize both of the sensing function and the control function, therefore, the wireless mesh node 122i can also collect measured environment data and control the HVAC equipment independently of the wireless mesh network and the server. Besides, in the control loop 210 in FIG. 2, each mesh node can receive commands from the server 114 through the router node and the router 116, send the commands to the HVAC equipment through the control node and transmit measured environment data and status data to the server.

As shown in FIG. 1 and FIG. 2, in the embodiment, the HVAC control system further includes a server 114. The server 114 communicates with the router 116, thereby establishing the wireless connection between the server 114 and the wireless mesh network 112. The wireless mesh network can be a WIFI mesh network, LoRa, Zigbee, or a Bluetooth mesh network or other kinds of network. In the embodiment, the WIFI mesh network is described as an example. The working frequency of the WIFI mesh network can be 2.4 GHz or 5 GHz, and preferably 2.4 GHz. Compared to other kinds of wireless network, 2.4 GHz WIFI mesh network has a faster transmitting speed, can satisfy the real-time requirement of the HVAC control, and do not need assistance from wired network. Therefore, the HVAC equipment can be controlled by a complete wireless mesh network.

The server 114 can communicate with the router 116 of one or more wireless mesh networks 112. The server 114 can receive the measured environment data collected by the sensing node from the router 116, and send control commands for controlling the HVAC equipment to the control node, then the control commands are sent to the HVAC equipment by the control node. In this situation, the server 114, the sensing node, the sensor, the control node and the HVAC equipment form a complete control loop. The control command sent by the server 114 can be a user command sent from a front-end client, or a control command generated based on a pre-defined control strategy after receiving the measured environment data.

Wherein, the pre-defined control strategy includes a plurality of control conditions, Input of each control condition may include measured environment data, expected environment data, time etc., output of each control condition may include switch signal, wind speed, wind direction, temperature setpoint etc. of the HVAC equipment. For example, a control condition is defined as turning on the HVAC equipment at 8 am on weekdays. When the control condition is satisfied, a turning on signal is sent to the HVAC equipment. For another example, a control condition is defined as decreasing the temperature setpoint of the HVAC equipment or increasing the wind speed of the HVAC equipment when the measured temperature is higher than an expected temperature. When the control condition is satisfied, a command to decrease the temperature setpoint or increase the wind speed is sent to the HVAC equipment.

In the embodiment, the sensor and HVAC equipment can be in one-to-one correspondence, or in many-to-one or one-to-many correspondence, each HVAC equipment is assigned to manage a specific area, and a plurality of different kinds of sensors may be disposed in each specific area. For smaller specific areas, a sensor can be used for detecting a plurality of specific areas. The sensing node stores a mapping relationship between the sensors and the HVAC equipment. After obtaining the measured environment data collected by a sensor, the sensing node searches for the ID or other identify information of the HVAC equipment corresponding to the sensor and sends the measured environment data to the control node configured to communicate with the HVAC equipment.

Figure 3:
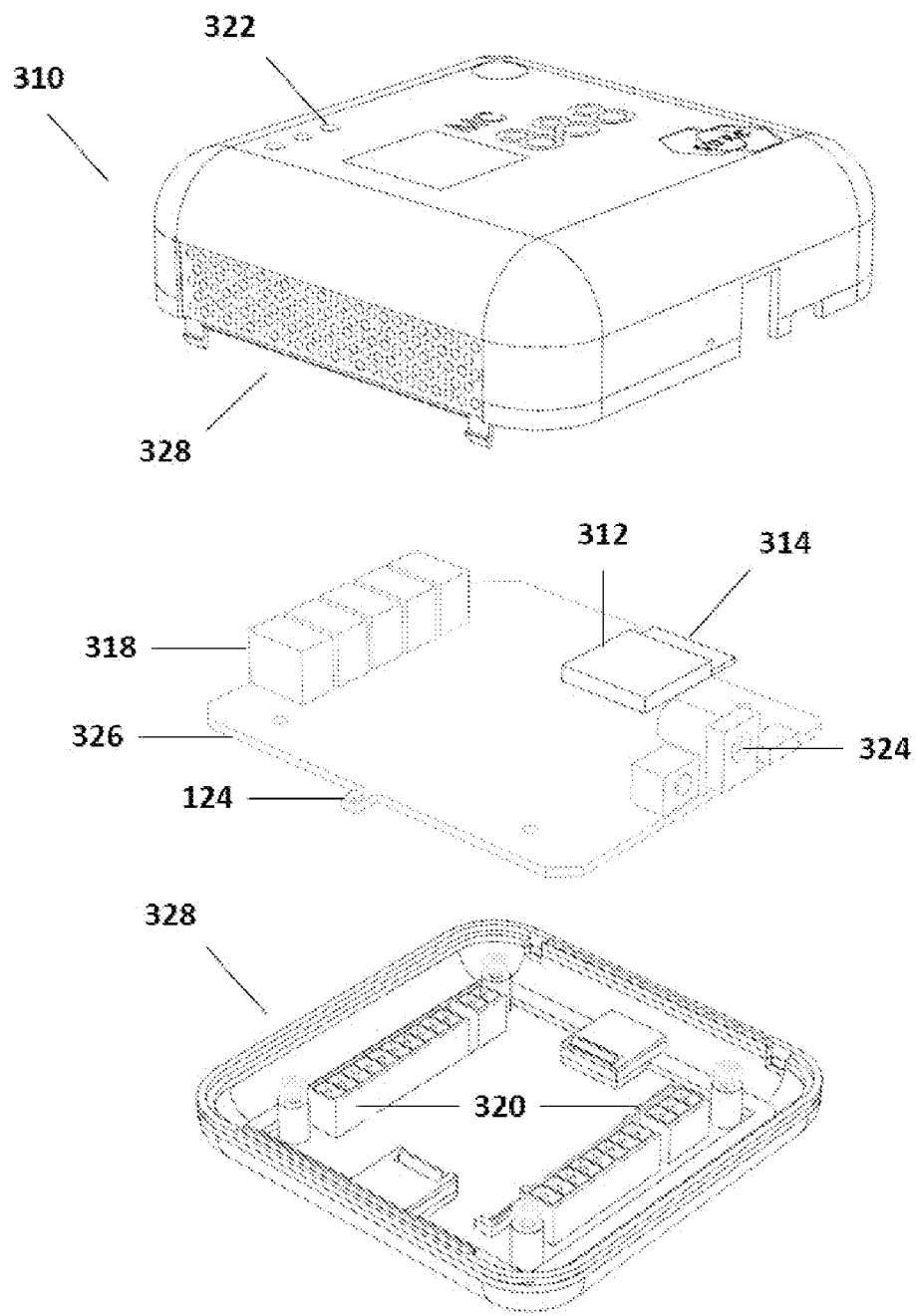
FIG. 3 is a schematic view of the structure of a wireless mesh device of the embodiment of the present disclosure.

The wireless mesh network 112 may include a plurality of wireless mesh devices 310 shown in FIG. 3. The wireless mesh devices 310 and the wireless mesh nodes 122 can be in one-to-one correspondence, that is, each wireless mesh device 310 works as an independent network node in the wireless mesh network 112. Each wireless mesh device 310 is configured to realize one or more of the functions of the sensing node, the control node, and the router node. For example, a wireless mesh device 310 may have one of the sensing function, the control function and the router function, or a wireless mesh device 310 may have both of the sensing function and the control function, or a wireless mesh device 310 may have all of the sensing function, the control function or the router function.

The wireless mesh device 310 includes a chip 312, a wireless communication module and an electrical control element 318. The chip 312 is configured to communicate with the sensors in the building through the wireless communication module or in a wired manner, obtaining the measured environment data collected by the sensors, generating the control commands to control the HVAC equipment corresponding to the sensors according to pre-defined control strategy, and sending the generated control commands to the corresponding HVAC equipment. The electrical control element 318 is used for signal conversion between the sensors, the HVAC equipment and the chip 312. In the embodiment, the electrical control element 318 includes one or more assemblies, which can convert the digital signal of the chip 312 to analog signal for the HVAC equipment, or convert the analog signal of the HVAC equipment to digital signal for the chip 312. The electrical control element 318 may include a relay, an amplifier, a rectifier, a PWM converter, an IC2 bus and/or a switch. The wireless communication module can be used for communication between the wireless mesh devices 310, and the communication between the wireless mesh device 310 and the router 116. The chip 312 may include one or more core, and execute corresponding actions based on the firmware.

In the embodiment, the wireless communication module may include an antenna 314 and a wireless input/output port 322. The antenna 314 can receive and send data, the protocol thereof includes but not limited to WIFI, LoRa, Zigbee and/or Bluetooth. The antenna 314 is disposed close to the chip 312, and is protrude from the housing 328. The antenna 314 can be used for the communication between the wireless mesh devices 310, and the communication between the wireless mesh device 310 and the router 116. The wireless input/output port 322 can be used for the communication between the wireless mesh device 310 and the HVAC equipment and the communication between the wireless mesh device 310 and the external sensor 120. The wireless input/output port 322 can support infrared communication or ultrasonic communication.

In the embodiment, the wireless mesh device 310 may further include a wired input/output port 320. The port 320 can be a pluggable wired communication port, therefore the wireless mesh device 310 can communicate with the HVAC equipment and the external sensor through a wired communication protocol. The wired communication protocol of the wired input/output port 320 may include but not limited to 0-10V, 4-20 mA, Modbus RTU, TCP/IP (Transmission Control Protocol/Internet Protocol), BACnet MSTP (Multi-Service Transport Platform), Bacnet TCP/IP, relays, I2C, 1-wire or GPIO (General-Purpose Input/Output), etc.

The specific structure of the wireless mesh device 310 is shown in FIG. 3. The wireless mesh device 310 includes a plastic housing 328 and a PCB board 326 inside the housing 328. The PCB board 326 is provided with the chip 312, the electrical control component 318, the internal sensor 124 and a power supply module 324. The internal sensor 124 may include one or more sensors for measuring environment parameters, such as temperature, humidity, lighting levels, $CO_2$ concentration, PM2.5 value, TVOC concentration, formaldehyde value or ozone value. Besides, the internal sensor 124 can also be used for measuring indoor motion parameters and location parameters, for example, a camera can be used for collecting and analyzing indoor images to obtain motion parameters and location parameters, or an infrared detector or a laser detector can be used for measuring motion parameters and location parameters. The power module 324 can use external power supply or internal battery to supply power to the wireless mesh device 310.

In an alternative embodiment, the wireless mesh device 310 can be provided with two circuit boards: a first circuit board and a second circuit board, which are connected to and communicate with each other. The first circuit board is provided with the wireless communication module, the chip 312 and the internal sensor 124. The second circuit board is provided with the wired input/output port 320 and the power supply module 324. Furthermore, the first circuit board can be further provided with another power supply module. The structures described here are only schematic, and not intended to be a limitation to the protection scope of the present disclosure. In other embodiments of the present disclosure, the wireless mesh device can also have other structures, which are all included in the protection scope of the present disclosure.

Figure 4:
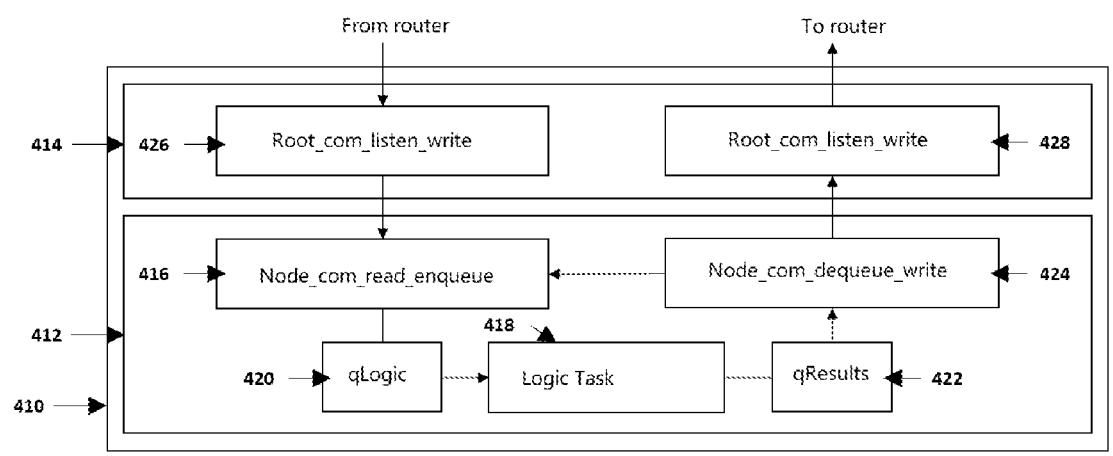
FIG. 4 is a schematic view of the firmware of the wireless mesh device of the embodiment of the present disclosure.

FIG. 4 shows a schematic view of the firmware 410 that is installed in the memory module of the wireless mesh device which manages data reception, transmission, management, sensing and control tasks to be executed by the chip and electrical component. The firmware is composed of main functions 412 and root functions 414. The main functions 412 include an enqueue task 416 and a logic task 418. The enqueue task 416 receives commands transmitted by other mesh nodes, or receives measured data from the sensors which may include measured environment data, motion parameters and location parameters, and places the commands or measured data in logic queues 420. The logic task 418 applies logical algorithms of the pre-defined control strategy on information in the logic queue 420, generates control commands based on the calculated output, sends the commands to the actuators connected to the mesh node in a wireless or wired manner, and sends the calculated output and status of the action to the results queue 422. The wired communication protocol can be 0-10V, 4-20 mA, Modbus RTU, Modbus TCP/IP, BACnet MSTP, Bacnet TCP/IP, relays, I2C, 1-wire or GPIO, etc. The wireless communication can be infrared communication, ultrasonic communication, etc. Furthermore, the logic task 422 regularly checks for configuration update commands from the logic queues 420. The dequeuing task 424 takes each item in the results queue 422 and sends it to their destination mesh nodes through the wireless mesh network. In the wireless mesh network, any mesh node can also act as a router node, and any router node can act as a root node 414, in which case it would additionally perform the root functions 414 which include the listen_write task 426 and the read_publish task 428. The listen_write task 426 receives commands from the server and distributes them to their destination mesh nodes. The read_publish task 428 receives information (such as measured data collected by the sensors, status of the action etc.) from the wireless mesh network and sends that information to the server through the router. Furthermore, firmware code of the wireless mesh nodes can be updated using data sent over the mesh network at a specified frequency or on-demand.

Figure 5:
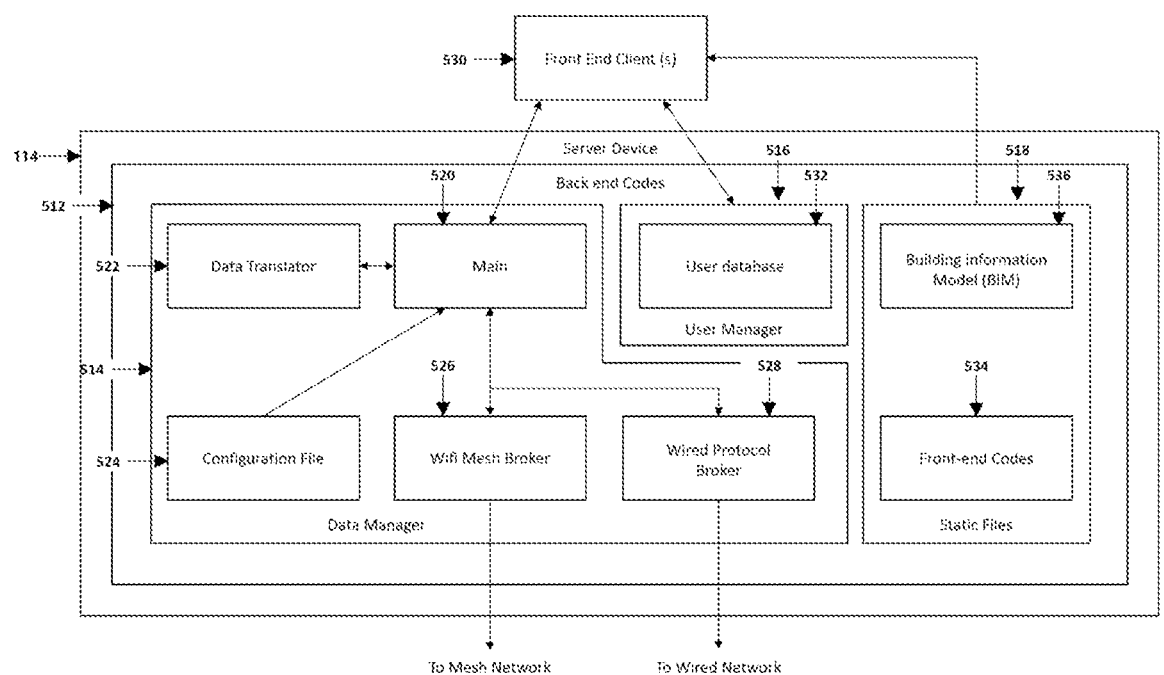
FIG. 5 is a schematic view of a server of the embodiment of the present disclosure.

FIG. 5 shows a schematic view of a server of the embodiment. The physical embodiment of the exemplary server can be any modern computing device that can execute the back-end codes 512, such as computers etc. In the embodiment, the server 114 is configured to communicate with the front-end client device 530, provide a user interface to the front-end client device 530, receive control commands from the front-end client device 530, and send the control commands to the HVAC equipment through the server, the router, the router nodes and the control nodes in turn. The control commands set by the front-end client device 530 include target environment parameters or adjustment to the control strategy. The server 114 converts the control commands of the front-end client device 530 to control commands that can be executed by HVAC equipment. For example, when a user uses the front-end client device 530, the user sets a target temperature of a specific floor, the server 114 generates control commands for controlling the HVAC equipment corresponding to the floor and sends the control commands to the control node. For another example, when a user uses the front-end client device 530, the user sets a command that turning on the HVAC equipment of a specific floor at 8 am and turning off the HVAC equipment of the specific floor at 6 pm. In this situation, the server 114 stores the control strategy, sends a turning on command to the control node at 8 am and sends a turning off command to the control node at 6 pm. Furthermore, for a mesh node having calculating functions, after the server 114 receiving the new control strategy set by the user and sending the new control strategy to the control node, the control node updates its stored control strategy.

As shown in FIG. 5, the back-end codes 512 include data manager 514, user manager 516, and static files 518. The data manager 514 includes main function 520, data translator function 522, configuration file 524, WIFI mesh broker 526, and wired network broker 528. The main function 520 sends data to the front-end client 530, receives commands from the front-end client 530 and performs checks to ensure that the commands are correctly executed within the wireless mesh network. The data translator function 522 converts commands sent from the front-end client device 530 to commands that can be executed by the mesh nodes. The data translator function 522 can also convert commands sent from the front-end client device 530 to commands that can be executed by devices on a wired building control network. The data translator function 522 also converts data from the mesh network and the wired building control network to data that can be displayed by the front-end client device 530. Furthermore, the data translator function 522 can convert commands from building control protocols including BACnet and Modbus to commands that can be executed by the mesh nodes, and conversely can convert data from the mesh nodes to the same building control protocols. The data translator function 522 enables the wireless mesh HVAC control system to act as a standalone control system, or to augment another HVAC control system by providing additional sensing notes and control notes connected to the wireless mesh network. The configuration file 524 provides the data manager with the hierarchy of systems, subsystems, devices groups, devices, and sensing and control points specific to each project where the HVAC control system is installed. The wireless mesh broker 526 establishes the connection between the data manager 514 and the router node of the mesh network. The wired network broker 528 establishes the connection between the data manager and devices on a wired building network. The user manager 516 contains a user database 532, which is used to validate login attempts made on the front-end client 530. The static files 518 contain the front-end codes 534, 2D project drawings and the 3D building information model (BIM) 536. The front-end codes 534 are sent to the front-end client 530 for generating the user interface in a web browser environment. The building information model 536 contains 3D object information describing the project where the HVAC control system is installed, HVAC equipment to be connected/controlled, and the locations of mesh nodes within all mesh networks of the HVAC control system. The 2D project drawings or the 3D building information model 536 can be embedded within the front-end user interface and can be used as an interactive interface for selection and manipulation of HVAC equipment to improve user friendliness. The user can check the status information of a specific area or send control commands corresponding to the HVAC equipment of a specific area by directly manipulating the 2D project drawings or the 3D building information model 536 in the front-end client 530. The building information model 536 can also be used in the server to assist in calculations required for building simulations and control algorithms, thereby increasing the accuracy for calculating the real-time location of the wireless mesh nodes and other wireless transmitters within the building.

In an embodiment, a building HVAC control method is further provided, using the above HVAC control system. The control method is realized based on at least one wireless mesh network including at least one router and a plurality of wireless mesh nodes, the wireless mesh nodes include at least one sensing node, at least one control node and at least one router node.

Figure 6:
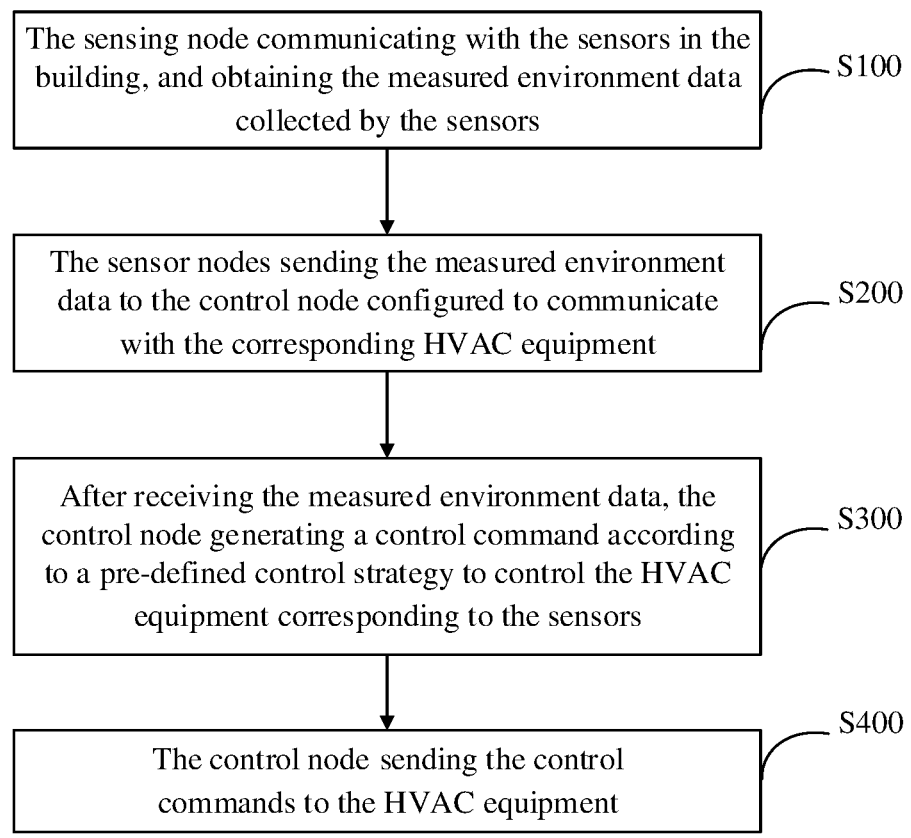
FIG. 6 is a flow chart of a building HVAC control method according to the embodiment of the present disclosure.

As shown in FIG. 6, the HVAC control method includes the following steps:

S100: the sensing node communicates with the sensors in the building, and obtains the measured environment data collected by the sensors; wherein the sensors include external sensors and internal sensors, the sensing node communicates with the external sensors in a wired and/or wireless manner, the sensors include but are not limited to one or more kinds of temperature sensors, humidity sensors, occupancy sensors, microphones, lighting level sensors, CO2 sensors, PM2.5 sensors, TVOC sensors, formaldehyde sensors or ozone sensors;

S200: the sensor nodes sending the measured environment data to the control node configured to communicate with the corresponding HVAC equipment;

S300: after receiving the measured environment data, the control node generates a control command according to a pre-defined control strategy to control the HVAC equipment corresponding to the sensors;

S400: the control node sends the control commands to the HVAC equipment, wherein the control node communicates with the HVAC equipment in a wired and/or wireless manner.

In the present disclosure, the wireless mesh network is applied for building HVAC control, the communication wiring of the HVAC equipment is simplified, the wireless mesh nodes can directly communicate with each other, the data transmission load of the router is decreased and the safety of data transmitting is increased. Furthermore, with the wireless mesh node processing the control strategy and generating the control commands in the step S200, there is no need to rely on the server to control the HVAC equipment, which reduces the computational load of the server, and increases the reliability of HVAC control.

Furthermore, in the embodiment, the HVAC control system further includes the following steps:

the router node receiving the control commands sent from the server through the router;

the router node sending the control commands sent from the server to the control node configured to communicate the corresponding HVAC equipment;

the control node sending the control commands sent from the server to the corresponding HVAC equipment.

The control commands sent from the server can be control commands sent from the front-end client, or control commands generated by the server based on a pre-defined control strategy and the measured environment data collected by the wireless mesh network.

The pre-defined control strategy can be a plurality of control conditions set by a user, and the user can modify the control strategy by operating the front-end client, the modified control strategy will be updated in the server and the control node. Input of each control condition may include measured environment data, expected environment data, time etc., output of each control condition may include switch signal, wind speed, wind direction, temperature setpoint etc. of the HVAC equipment. For example, a control condition is defined as turning on the HVAC equipment at 8 am on weekdays. When the control condition is satisfied, a turning on signal is sent to the HVAC equipment. For another example, a control condition is defined as decreasing the temperature setpoint of the HVAC equipment or increasing the wind speed of the HVAC equipment when the measured temperature is higher than an expected temperature. When the control condition is satisfied, a command to decrease the temperature setpoint or increase the wind speed is sent to the HVAC equipment. Specifically, when a control condition is defined as turning on the HVAC equipment at 8 am on weekdays, the wireless mesh node or the server will automatically generate a control command to turn on the HVAC equipment at 8 am on weekdays. The input of the control condition can also be a combination of a plurality of parameters, for example, a control condition is satisfied when the measured temperature is in a specific scope, and the humidity is in a specific scope.

Besides, the control commands sent from the front-end client to the server may include control commands of the HVAC equipment in a specific area. For example, the user can send a turning on command of the HVAC equipment in a specific room, the control command is sent to the HVAC equipment through the server, the router, the router node and the control node in turn.

Specifically, when the wireless mesh device in FIG. 3 is used as the wireless mesh node in the wireless mesh network, the chip processes the control strategy, and generates corresponding control direction. For example, temperature measurements from one or multiple sensing nodes distributed around a room (collectively "the sensing nodes") at desk height measure temperature perceived by building occupants. The temperature measurements collected by the sensing nodes are sent through a pre-defined communication channel directly to the mesh controllers controlling the HVAC equipment within that room. The control node can use on-board control algorithms to calculate the average and extreme temperature measurements, and compare these values against pre-defined temperature setpoints for the room. Based on this analysis, the control node can send a set of fan speed, valve position, or on/off commands to one or multiple pieces of HVAC equipment that can control the temperature of the room. A mesh node may analyze one or multiple pieces of information that does not pass through the server, received through a "local control loop" either directly from other mesh nodes or from sensors on-board or connected to the mesh node itself. Based on on-board analysis of the information, the mesh node can issue control signals to connected building equipment. One benefit of local control loops is the reduction of computational load of the server and the data transmission load on the mesh network, in particular the router node, thereby greatly decreasing the latency of the overall control system. Another benefit of local control loops is that they continue to function in the absence of a server, or in case of server malfunction. In another embodiment, the measurements collected by the sensing nodes can also be sent to the server through the router nodes, the server can use control algorithms to calculate the average and extreme temperature measurements, and compare these values against pre-defined temperature setpoints for the room. Based on this analysis, the server can send a set of fan speed, valve position, or on/off commands to the control node connected to one or multiple pieces of HVAC equipment that can control the temperature of the room, and then the control commands are sent from the control node to the HVAC equipment. The methods of the mesh node generates the control commands and the methods of the server generates the control commands may be adopted respectively in different embodiments, or combined in a same embodiment and adopted in different situations. When the methods are combined, a transition condition can be pre-defined. For example, when the data processing load of the mesh node is too large, the server processing methods can be adopted, when the server has too many processing tasks or the server breaks down, the mesh node processing methods can be adopted. Therefore, the advantages of adopting the server processing methods and the mesh node processing methods can be combined.

In the embodiment, the sensors may also include motion sensors that sense motion in a building area. For example, the motion sensors can detect the motion parameters in a specific area using infrared ray or laser. The motion parameters may include motion speed and personal location. Each motion sensor may be connected to a mesh node. The sensing node is further configured to obtain the motion parameters collected by the motion sensors. Therefore, each mesh node having a motion sensor may transmit a message to the network regarding the motion sensed within the range of its motion sensor.

Each mesh node can also calculate the amount of time elapsed since occupancy was last detected. In response to the motion information received, a mesh node connected to building HVAC equipment may direct the operation of that HVAC equipment. When judging that a specific area is not occupied according to the measured motion data, the control node or the server calculates a time difference between the last time detecting occupancy and the current time, and when the time difference is larger than or equal to a pre-defined threshold, the control node or the server generates a control command for turning off the corresponding HVAC equipment. For example, the sensing node can detect through the motion sensor that there are no persons within a room of a building for the previous 15 minutes. The mesh node can send this information to the mesh network, which analyzes the information and sends a command or set of commands to mesh nodes controlling HVAC equipment in that room to turn off that equipment. Alternatively, a mesh node can detect that a previously unoccupied room has now become occupied. The mesh node can send this information to the mesh network, which analyzes the information and sends a command or set of commands to mesh nodes controlling HVAC equipment in that room to turn on that equipment.

Specifically, when the wireless mesh device in FIG. 3 is used as the wireless mesh node, the chip of the wireless mesh device further collects the motion detecting data from the motion sensors (internal sensors or external sensors) or other mesh nodes. When judging that a specific area is not occupied according to the measured motion data, the chip calculates a time difference between the last time detecting occupancy and the current time, and when the time difference is larger than or equal to a pre-defined threshold, the chip generates a control command for turning off the corresponding HVAC equipment.

Furthermore, in the embodiment, the HVAC control system may further adjust the flow of hot or chilled water within the HVAC system in order to minimize energy consumption without affecting thermal comfort in the conditioned spaces of the building. A set of mesh nodes within the control system can control a series of valves that affect the flow rate of hot chilled water through the HVAC system based on measured room temperature and water temperature inside the HVAC system pipes. Precise control of hot or chilled water flow rates throughout the entire HVAC system piping network can create the effect of reducing pumping energy and optimizing the temperature difference or delta T at the central HVAC plant. Both of these effects can greatly increase the energy efficiency of the HVAC system as a whole.

Specifically, the control commands include temperature control commands and flow rate control commands. After generating the temperature control commands or receiving the temperature control commands from the server, the control node sends the temperature control commands to the corresponding HVAC equipment, and sends flow rate control commands to a flow control valve of the corresponding HVAC equipment, to control the flow rate of water in a corresponding water supply and return loop, to realize that the controlled temperature is controlled to an indoor temperature setpoint at a minimum flow rate. The temperature control commands control the fan coil units, and the flow rate control commands control the valves of cold water pipe or hot water pipe.

For example, an HVAC system is comprised of a central plant, a series of water supply and return loops, and a set of fan coil units that are connected to each loop. The central plant uses energy to generate chilled or hot water and uses energy to pump water through each of the loops on each floor. The generation of chilled or hot water increases in efficiency with a greater difference between the supply and return temperature (the "delta T"). Therefore, the central plant uses less energy if the delta T increases, and the overall flow rate decreases. At the return side of each loop, a valve controls the water flow rate through that loop. Each valve is controlled by a mesh node that has an external temperature sensor measuring the water temperature by the valve location (the "valve controller node"). Each fan coil unit controls the temperature of the air within the room where it is installed. Each fan coil unit is controlled by a mesh node that has an on-board temperature sensor measuring the temperature of the room (the "FCU controller node"). The FCU controller node acts on commands sent from the server or from a local control loop to maintain the temperature of the room within user-defined setpoints. At the same time, the valve controller node will slow down the flow of the water within the loop to maximize the heat transfer between the water and air within each FCU, thereby increasing the delta T of each loop. The valve controller node will set the valve position at the point which maximizes the delta T of the loop without affecting the ability of the FCU controller node to satisfy the user-defined setpoint within each room. As a result, the flow of each loop is minimized and delta T is maximized, without any negative impact to the thermal comfort of each room. Therefore, the central plant uses less energy due to lower overall flow and greater overall delta T.

Specifically, when the wireless mesh device in FIG. 3 is used as the wireless mesh node, after generating the temperature control commands or receiving the temperature control commands from the server, the chip sends the temperature control commands to the corresponding HVAC equipment.

In an embodiment, the temperature commands and the flow rate control commands can be sent from a same mesh node, in another embodiment, the commands can be sent from different mesh nodes. For example, a control node is configured to control the fan coils unit of the HVAC equipment, another mesh node is configured to control the flow control valve of the HVAC equipment. In a different example, the FCU controller node can also directly control the valve belonging to the FCU itself, eliminating the requirement for a separate mesh node controlling a separate valve.

In the embodiment, the server is further configured to manage a building information model, which at least includes virtual addresses identifying the location and function of mesh nodes within the HVAC control system. In the building information model, the virtual address of each mesh node is mapped to the physical address of the mesh node. For example, a series of mesh nodes are installed on a floor of a building, forming a mesh network. The building information model or set of drawings indicate the position of each mesh node and its address. Typically, a commissioning engineer would be tasked to manually assign the address of each mesh node by looking at the drawings, which is a time consuming and error-prone process. In the embodiment, virtual addresses can be automatically assigned through an analysis of wireless communication signal strength between the mesh nodes and signal impedance between nodes calculated using the building information model. This solves the significant problem of ensuring the physical node addresses are correctly mapped to the virtual node addresses within the HVAC control system.

Specifically, the server defining the virtual addresses of the wireless mesh nodes according to the data of communication signal strength, comprising:

the server generating a first graph according to the data of communication signal strength, wherein, in the first graph, each node represents a physical address of each wireless mesh node, each edge represents the communication signal strength between each pair of wireless mesh nodes; the communication signal strength between each pair of wireless mesh nodes is calculated according to measured signal strength data of the wireless mesh nodes in the wireless mesh network;

the server generating a simulated signal strength between each pair of wireless mesh nodes according to a distance between each pair of wireless mesh nodes and types of walls between each pair of wireless mesh nodes, and generating a second graph, wherein, in the second graph, each node represents the virtual address of each wireless mesh node, each edge represents the simulated signal strength between each pair of wireless mesh nodes; specifically, the distance between each pair of wireless mesh nodes and the type of one or more partition wall between each pair of wireless mesh nodes can be gotten from the 3D building information model, the simulated signal strength can be calculated with a pre-defined mathematical model, for example, signal attenuation rates of different distance ranges, signal attenuation rates of different types of walls are set in the mathematical model. The signal sent from a wireless mesh node is attenuated for the distance and the walls and then received by another wireless mesh node. The simulated signal strength received by another wireless mesh node can be calculated based on the original signal strength, the signal attenuation for the distance and the signal attenuation for the walls.

The server establishes a mapping relationship between the first graph and the second graph by a mapping algorithm that associates each node in the first graph and each node in the second graph, wherein, a difference between an edge in the first graph and a corresponding edge in the second graph is less than a pre-defined threshold. That is, the mapping algorithm associates each virtual address with each physical address by minimizing the difference between simulated and actual signal strength between virtual and physical nodes. The mapping algorithm can take one or multiple manually mapped nodes as inputs to increase accuracy of the results.

Above all, the HVAC control system, method, and wireless mesh communication device include the following advantages:

the present disclosure solves the technical problems in the existing technology, wireless mesh networks are used for controlling HVAC equipment, the control communication wiring of the building HVAC equipment is simplified, the wireless mesh nodes can communicate with each other, thereby decreasing the data transmission load of the routers and increasing the safety of transmitting data at the same time. Furthermore, the mesh nodes in the mesh networks are capable of generating control commands automatically based on the pre-defined control strategy and data collected by the sensors, the control of the HVAC equipment can be independent of the server, the computational load of the server can be reduced, and the reliability of the HVAC control is increased.

The above is a detailed description of the present disclosure in connection with the specific preferred embodiments, and the specific embodiments of the present disclosure are not limited to the description. Modifications and substitutions can be made without departing from the spirit and scope of the present disclosure.

What is claimed is:

1. A building HVAC control system, comprising at least one wireless mesh network and a server, wherein, the at least one wireless mesh network comprises at least one router and a plurality of wireless mesh nodes, the plurality of wireless mesh nodes comprise:
   at least one sensing node comprising at least a chip configured to communicate with sensors installed in a building, and obtain measured environment data collected by the sensors;
   at least one control node comprising at least a chip configured to communicate with HVAC equipment, and send control commands to the HVAC equipment; and
   at least one router node, configured to transmit data between the plurality of wireless mesh nodes, and transmit data between the plurality of wireless mesh nodes and the at least one router;
   wherein, the server is configured to:
      communicate with the at least one router,
      manage a building information model, the building information model comprises virtual addresses of the plurality of wireless mesh nodes in the building;
      obtain data of communication signal strength between each pair of the plurality of wireless mesh nodes in the at least one wireless mesh network;
      define the virtual addresses of the plurality of wireless mesh nodes according to the data of communication signal strength, by:
         generating a first graph according to the data of communication signal strength, wherein, in the first graph, each node represents a physical address of each wireless mesh node of the plurality of wireless mesh nodes, each edge represents the communication signal strength between each pair of the plurality of wireless mesh nodes;
         generating a simulated signal strength between each pair of the plurality of wireless mesh nodes according to a distance between each pair of the plurality of wireless mesh nodes and walls between each pair of the plurality of wireless mesh nodes, and generating a second graph, wherein, in the second graph, each node represents the virtual address of each wireless mesh node of the plurality of mesh nodes, each edge represents the simulated signal strength between each pair of the plurality of wireless mesh nodes; and
         establishing a mapping relationship between the first graph and the second graph by a mapping algorithm that associates each node in the first graph and each node in the second graph, wherein, a difference between an edge in the first graph and a corresponding edge in the second graph is less than a threshold.

2. The control system according to claim 1, wherein, the at least one sensing node is configured to send the measured environment data to the at least one control node configured to communicate with corresponding HVAC equipment;
   after receiving the measured environment data, the at least one control node is configured to generate the control commands according to a control strategy for controlling the corresponding HVAC equipment.

3. The control system according to claim 2, wherein the plurality of wireless mesh nodes are configured to perform device-to-device communications by transmitting and receiving wireless signals through the at least one wireless mesh network without passing through the server, thereby enabling efficient, multi-node control loops that add no additional computational load to the server while increasing the safety of data transmission and the overall reliability of the HVAC control system.

4. The control system according to claim 1, wherein, each of the plurality wireless mesh nodes is configured to realize one or more functions of the at least one sensing node, the at least one control node or the at least one router node.

5. The control system according to claim 1, wherein, the sensors comprise at least one external sensor disposed outside the at least one sensing node and at least one internal sensor disposed inside the at least one sensing node.

6. The control system according to claim 1, wherein, a working frequency of the at least one wireless mesh network is 2.4 GHz or 5 GHz.

7. The control system according to claim 6, wherein, the at least one wireless mesh network is a Wi-Fi, LoRa, Zigbee or Bluetooth mesh network communicating at 2.4 GHz.

8. The control system according to claim 1, wherein, the server is configured to communicate with a front-end client device, provide a user interface to the front-end client device, receive control commands from the front-end client device, and send the control commands to the HVAC equipment through the server, the router, the at least one router node and the at least one control node in turn.

9. The control system according to claim 8, wherein, the server is further configured to store a building information model, the building information model comprises information of the plurality of wireless mesh nodes and information of the HVAC equipment in the building.

10. The control system according to claim 1, wherein, the at least one sensing node is further configured to obtain measured motion data collected by the sensors;
    wherein, when detecting that a specific area is not occupied according to the measured motion data, the at least one control node or the server is configured to:
       calculate a time difference between a last time detecting occupancy and a current time, and
       when the time difference is larger than or equal to a time threshold, the at least one control node or the server generates a control command for turning off the corresponding HVAC equipment.

11. The control system according to claim 1, wherein, the control commands comprise temperature control commands and flow rate control commands;
    wherein, after generating the temperature control commands or receiving the temperature control commands from the server, the at least one control node sends a temperature control command to the corresponding HVAC equipment, and sends a flow rate control command to a flow control valve of the corresponding HVAC equipment, to control a flow rate of water in a corresponding water supply and return loop, to realize that the temperature is controlled to an indoor temperature setpoint at a minimum flow rate.

12. A building HVAC control method, using the building HVAC control system according to claim 1, and comprising:
    at the at least one sensing node, communicating with the sensors in the building, and obtaining the measured environment data collected by the sensors;
    at the at least one sensing node, sending the measured environment data to the at least one control node configured to control the corresponding HVAC equipment; and
    at the at least one control node, after receiving the measured environment data, generating a control command according to a control strategy to control the HVAC equipment corresponding to the sensors; and at the at least one control node, sending the control commands to the HVAC equipment.

13. A wireless mesh device used in the building HVAC control system according to claim 1, wherein, the device comprises:

a chip, configured to communicate with sensors in a building, collect measured environment data from the sensors, generate control commands according to a control strategy to control the HVAC equipment corresponding to the sensors, and send the control commands to a corresponding HVAC equipment;

a wireless communication interface; and an electrical controller configured to perform signal conversion between the sensors, the HVAC equipment and the chip.

14. The wireless mesh device according to claim 13, further comprising an internal sensor configured to collect measured environment data, wherein the chip is configured to communicate with external sensors disposed outside the mesh device and communicate with the internal sensor disposed inside the mesh device.

15. The wireless mesh device according to claim 13, wherein, the chip is further configured to obtain measured motion data collected by the sensors, wherein:

when a specific area is not occupied according to the measured motion data, the chip is configured to calculate a time difference between a last time detecting occupancy and a current time, and when the time difference is larger than or equal to a time threshold, the chip is configured to generate a control command for turning off the corresponding HVAC equipment.

16. The wireless mesh device according to claim 13, wherein, the control commands comprise temperature control commands and flow rate control commands;

wherein, when the chip is configured to generate a temperature control command, the chip also configured to generate a flow rate control command to control a flow rate of water in a corresponding water supply and return loop, wherein the controlled temperature is controlled to an indoor temperature setpoint at a minimum flow rate.

* * * * *